United States Patent
Awano

(10) Patent No.: US 10,272,822 B2
(45) Date of Patent: Apr. 30, 2019

(54) HEADLIGHT CONTROL DATA GENERATION DEVICE AND VEHICLE CONTROL DEVICE

(71) Applicant: TOYOTA JIDOSHA KABUSHIKI KAISHA, Toyota-shi, Aichi-ken (JP)

(72) Inventor: Hiroki Awano, Tokyo (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/817,883

(22) Filed: Nov. 20, 2017

(65) Prior Publication Data

US 2018/0154820 A1 Jun. 7, 2018

(30) Foreign Application Priority Data

Dec. 7, 2016 (JP) ................... 2016-237739

(51) Int. Cl.
- *B60Q 1/14* (2006.01)
- *B60Q 1/00* (2006.01)
- *G05B 13/02* (2006.01)

(52) U.S. Cl.
CPC ......... *B60Q 1/1423* (2013.01); *B60Q 1/0076* (2013.01); *G05B 13/0265* (2013.01)

(58) Field of Classification Search
None
See application file for complete search history.

(56) References Cited

U.S. PATENT DOCUMENTS

2007/0268159 A1* 11/2007 Futamura ............... B60Q 1/143
340/933

FOREIGN PATENT DOCUMENTS

| JP | H05-278518 A | 10/1993 |
| JP | 2007-308012 A | 11/2007 |
| JP | 2012-171485 A | 9/2012 |

* cited by examiner

*Primary Examiner* — Douglas W Owens
*Assistant Examiner* — Jianzi Chen
(74) *Attorney, Agent, or Firm* — Hunton Andrews Kurth LLP

(57) ABSTRACT

A headlight control data generation device that generates headlight control data of a vehicle including a headlight includes an electronic control unit. The electronic control unit sequentially acquires, when a manual mode is selected, set data including a detection value of an illuminance around the vehicle, and ON and OFF data indicating that the headlight is in an ON state or in an OFF state at the time of sampling of the detection value, and generates the headlight control data based on the acquired set data. The headlight control data includes data regarding information on a probability of the headlight being in an ON state.

11 Claims, 9 Drawing Sheets

HEADLIGHT CONTROL DATA GENERATION DEVICE AND VEHICLE CONTROL DEVICE

INCORPORATION BY REFERENCE

The disclosure of Japanese Patent Application No. 2016-237739 filed on Dec. 7, 2016 including the specification, drawings and abstract is incorporated herein by reference in its entirety.

BACKGROUND

1. Technical Field

The present disclosure relates to a headlight control data generation device that generates control data for a headlight of a vehicle, and a vehicle control device that uses the control data.

2. Description of Related Art

For example, JP 2012-171485 describes a device that learns a switching threshold value in an automatic mode in which a user automatically performs a switching operation from one of an ON state and an OFF state of headlights to the other in a vehicle in which a manual mode in which the user manually performs the switching operation from one of the ON state and the OFF state of the headlights to the other, or the automatic mode can be selected. When a switch for learning the threshold value for switching the headlights from the OFF state to the ON state, which is a learning switch different from a switch that is normally used in the manual mode, is operated, the device learns illuminance at that time as a threshold value for switching the headlights from the OFF state to the ON state in the automatic mode.

SUMMARY

However, in the above case, learning cannot be performed unless a state appropriate for an operation of the learning switch occurs. Therefore, for example, when switching of the headlight to the ON state is performed using a normal switch immediately before the start of the vehicle, and switching of the headlight to the OFF state is performed using the normal switch immediately before a user gets out of the vehicle, the learning cannot be performed.

The present disclosure provides a headlight control data generation device that is capable of learning a switching timing without a user detecting a timing at which a headlight is switched from one of an ON state and an OFF state to the other in a manual mode, and a vehicle control device using headlight control data.

A first aspect of the present disclosure relates to a headlight control data generation device that generates headlight control data of a vehicle including a headlight. The headlight control data is data that is used in an automatic mode in the vehicle selecting a manual mode in which a user manually performs a switching operation from one of an ON state and an OFF state of the headlight to another, or the automatic mode in which at least one of a process of automatically performing the switching operation and a process of outputting a guidance notification signal for requesting the switching operation to a notification device is executed. The headlight control data generation device includes an electronic control unit. The electronic control unit is configured to sequentially acquire, when the manual mode is selected, set data including a detection value of an illuminance around the vehicle, and ON and OFF data indicating that the headlight is in the ON state or in the OFF state at the time of sampling of the detection value, and generate the headlight control data based on the acquired set data. The headlight control data includes data regarding information on a probability of the headlight being in an ON state. The information on a probability of the headlight being in an ON state is information in which a probability of the headlight being in the ON state increases when the illuminance is within a predetermined range when a proportion of the set data indicating that the headlight is in the ON state among the set data indicating that the detection value of the illuminance is within the predetermined range is relatively high, as compared with when the proportion of the set data is relatively low.

According to the first aspect of the present disclosure, the electronic control unit generates data including information on a probability of the headlight being in the ON state based on the set data of the illuminance and the state of the headlight at that time independently of the ON and OFF switching operation of the headlight of the user. That is, for example, in a certain illuminance area, even when the user does not perform the ON and OFF switching operation, the electronic control unit generates data having information on a probability of the headlight being in the ON state in the illuminance area according to whether the headlight is continuously in the ON state or in the OFF state. A tendency of the ON and OFF operation of the headlight of the user is reflected in the probability information. Therefore, since the probability information can be used to determine the illuminance when the user performs the ON and OFF switching operation of the headlight in the manual mode, it is possible to learn a switching timing without a user detecting a timing at which the headlight is switched from one of the ON state and the OFF state to the other in the manual mode.

In the headlight control data generation device according to the first aspect of the present disclosure, an ON switching threshold value that is a threshold value of the illuminance for switching from the ON state to the OFF state in the automatic mode and an OFF switching threshold value that is a threshold value of the illuminance for switching from the OFF state to the ON state in the automatic mode may be set independently of each other. The headlight control data may include, as data including the information on the probability of the headlight being in the ON state, data regarding ON switching probability information for generating the ON switching threshold value, and data regarding OFF switching probability information for generating the OFF switching threshold value. The electronic control unit may be configured to further determine a percentage of contribution to the ON switching probability information of the acquired set data and a percentage of contribution to the OFF switching probability information of the acquired set data based on information on the illuminance around the vehicle.

According to the first aspect of the present disclosure, through a process of determining a percentage of contribution to the ON switching probability information and a percentage of contribution to the OFF switching probability information, it is possible to determine whether the plurality of acquired set data is to be used for generation of data regarding the ON switching probability information, is to be used for generation of data regarding the OFF switching probability information, or is to be used for both of the generation of the data regarding the ON switching probability information and the generation of the data regarding the OFF switching probability information. Therefore, it is possible to generate both of the data regarding the ON switching probability information and the data regarding the OFF switching probability information based on the set data.

The ON switching threshold value can be set based on the data regarding the ON switching probability information, and the OFF switching threshold value can be set based on the data regarding the OFF switching probability information.

In the headlight control data generation device according to the first aspect of the present disclosure, the information on the illuminance may be information indicating whether the illuminance tends to decrease or the illuminance tends to increase, and the electronic control unit may be configured to further determine whether the illuminance tends to decrease or tends to increase.

According to the first aspect of the present disclosure, when the illuminance tends to increase, the user tends to switch the headlight from the ON state to the OFF state in the manual mode. On the other hand, when the illuminance tends to decrease, the user tends to switch the headlight from the OFF state to the ON state in the manual mode. Therefore, according to the information on the illuminance indicating whether the illuminance tends to decrease or tends to increase, it is possible to determine a percentage of contribution to the ON switching probability information and a percentage of contribution to the OFF switching probability information.

In the headlight control data generation device according to the first aspect of the present disclosure, the electronic control unit may be configured to determine whether the illuminance tends to increase or tends to decrease based on a time zone. In general, the illuminance tends to increase from morning to noon, and the illuminance tends to decrease after evening. According to the first aspect of the present disclosure, it is possible to easily acquire the information on the illuminance as time zone information in consideration of the above-described tendency.

In the headlight control data generation device according to the first aspect of the present disclosure, the electronic control unit may be configured to calculate a posterior distribution of an adjustment parameter of an ON switching class posterior probability based on the set data, the ON switching class posterior probability, and an ON switching prior distribution, and calculate a posterior distribution of an adjustment parameter of an OFF switching class posterior probability based on the set data, the OFF switching class posterior probability, and an OFF switching prior distribution. The ON switching class posterior probability may be a function in which a detection value of the illuminance is an independent variable, and a probability of the headlight being in an ON state or an OFF state is a dependent variable, the function being a function for switching from the OFF state to the ON state. The ON switching prior distribution may be a probability distribution of the adjustment parameter for adjusting a value of the dependent variable with respect to the value of the independent variable of the ON switching class posterior probability. The OFF switching class posterior probability may be a function in which a detection value of the illuminance is an independent variable, and a probability of the headlight being in an ON state or an OFF state is a dependent variable, the function being a function for switching from the ON state to the OFF state. The OFF switching prior distribution may be a probability distribution of the adjustment parameter for adjusting a value of the dependent variable with respect to the value of the independent variable of the OFF switching class posterior probability. The data regarding the ON switching probability information may include data on the posterior distribution of the adjustment parameter in the ON switching class posterior probability. The data regarding the OFF switching probability information may include data on the posterior distribution of the adjustment parameter in the OFF switching class posterior probability.

According to the first aspect of the present disclosure, the adjustment parameter of the ON switching class posterior probability is caused to follow the probability distribution, and the probability distribution is updated by learning, and the adjustment parameter of the OFF switching class posterior probability is caused to follow the probability distribution, and the probability distribution is updated by learning. Thus, it is possible to suppress excessively inappropriate learning based on an accidental value of the set data, as compared with a case where the value of the adjustment parameter is directly fitted from the set data.

In the headlight control data generation device according to the first aspect of the present disclosure, the electronic control unit may be configured to further determine whether a traveling speed of the vehicle is equal to or lower than a threshold value. The electronic control unit may be configured to use the acquired set data for generation of the headlight control data on condition that it is not determined that the traveling speed of the vehicle is equal to or lower than the threshold value.

For example, a phenomenon in which the headlight is switched to an OFF state in consideration of the presence of an oncoming vehicle when the vehicle is stopped at an intersection or the like may occur. When learning is performed using the set data when such a phenomenon occurs, a tendency different from an original tendency of an ON and OFF switching operation of the headlight of the user is likely to be learned. According to the first aspect of the present disclosure, the occurrence of such a situation is suppressed by not using the set data when the traveling speed is equal to or smaller than a threshold value, for learning.

In the headlight control data generation device according to the first aspect of the present disclosure, the electronic control unit may be configured to further determine whether or not the vehicle passes through a tunnel. The electronic control unit may be configured to use the acquired set data for generation of the headlight control data on condition that it is not determined that the vehicle passes through the tunnel.

Since the illuminance around the vehicle is rapidly changed when the vehicle passes through the tunnel, the user tends to perform an ON and OFF operation of the headlight with a tendency different from an original tendency of the ON and OFF switching operation of the headlight. According to the first aspect of the present disclosure, learning of a tendency different from an original tendency of an ON and OFF switching operation of the headlight of the user is suppressed by not using the set data for learning when the vehicle passes through the tunnel.

In the headlight control data generation device according to the first aspect of the present disclosure, the electronic control unit may be configured to further determine whether or not there is a predetermined building within a predetermined distance from the vehicle. The electronic control unit may be configured to use the acquired set data for generation of the headlight control data on condition that the electronic control unit does not determine that there is the predetermined building.

For example, when the vehicle passes through the vicinity of a relatively high building, the illuminance may be rapidly decreased due to a shadow of the building. Further, for example, when the vehicle passes through the vicinity of a building such as a commercial facility using a plurality of illuminations, the illuminance around the vehicle may be rapidly increased. Thus, when the illuminance around the vehicle is rapidly changed, the user is likely to perform an ON and OFF operation of the headlight with a tendency different from an original tendency of the ON and OFF switching operation of the headlight. According to the first aspect of the present disclosure, learning of a tendency different from an original tendency of an ON and OFF switching operation of the headlight of the user is suppressed by not using the set data when a distance from a predetermined building is equal to or smaller than a predetermined distance, for learning.

A second aspect of the present disclosure relates to a vehicle control device including the headlight control data generation device of the first aspect of the present disclosure. The electronic control unit is configured to set the ON switching threshold value and the OFF switching threshold value based on the headlight control data. The electronic control unit performs switching from the OFF state to the ON state of the headlight on condition that the detection value of the illuminance is smaller than the ON switching threshold value when the headlight is in the OFF state in the automatic mode, and performs switching from the ON state to the OFF state of the headlight on condition that the detection value of the illuminance is greater than the OFF switching threshold value when the headlight is in the ON state in the automatic mode.

According to the second aspect of the present disclosure, it is possible to suppress the user feeling uncomfortable in the automatic mode by executing the automatic mode based on the threshold value in which a tendency of a user switching the headlight from one of the ON state and the OFF state to the other has been reflected.

A third aspect of the present disclosure relates to a headlight control data generation device that generates headlight control data of a vehicle including a headlight. The headlight control data is data that is used in an automatic mode in the vehicle selecting a manual mode in which a user manually performs a switching operation from one of an ON state and an OFF state of the headlight to another, or the automatic mode in which at least one of a process of automatically performing the switching operation and a process of outputting a guidance notification signal for requesting the switching operation to a notification device is executed. The headlight control data generation device includes an electronic control unit. The electronic control unit is configured to sequentially acquire, when the manual mode is selected, set data including a detection value of an illuminance around the vehicle, and ON and OFF data indicating that the headlight is in the ON state or in the OFF state at the time of sampling of the detection value, and generate the headlight control data based on the acquired set data. The headlight control data includes a threshold value for the switching operation in the automatic mode, and the electronic control unit is configured to set the threshold value in an area of the illuminance in which both of the set data with which the headlight is in the ON state and the set data with which the headlight is in the OFF state coexist.

For example, when the headlight is continuously in an ON state in a certain illuminance area, it is conceivable that the user is generally highly unlikely to have a tendency to switch the headlight from one of the ON state and the OFF state to the other in the illuminance area. Further, for example, when the headlight is continuously in an OFF state in another illuminance area, it is conceivable that the user is generally highly unlikely to have a tendency to switch the headlight from one of the ON state and the OFF state to the other in the illuminance area. According to the third aspect of the present disclosure, the electronic control unit acquires the set data of the illuminance and the state of the headlight at the that time independently of the ON and OFF switching operation of the headlight of the user, and sets a threshold value regarding an illuminance area in which an ON state and an OFF state of the headlight coexist. Here, in the illuminance area in which an ON state and an OFF state of the headlight coexist, it is conceivable that the user is relatively highly likely to have a tendency to switch the headlight from one of the ON state and the OFF state to the other. Therefore, it is possible to learn a switching timing without a user detecting a timing at which the headlight is switched from one of the ON state and the OFF state to the other in the manual mode.

A fourth aspect of the present disclosure relates to vehicle control device including the headlight control data generation device of the third aspect of the present disclosure. The electronic control unit is configured to perform switching to the other of the OFF state and the ON state of the headlight based on a magnitude comparison between the detection value of the illuminance and the threshold value when the headlight is in any one of the ON state and the OFF state in the automatic mode.

According to the fourth aspect of the present disclosure, it is possible to suppress the user feeling uncomfortable in the automatic mode by executing the automatic mode based on the threshold value in which a tendency of a user switching the headlight from one of the ON state and the OFF state to the other has been reflected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a headlight control data generation device and a vehicle control device will be described with reference to the drawings.

Figure 1:
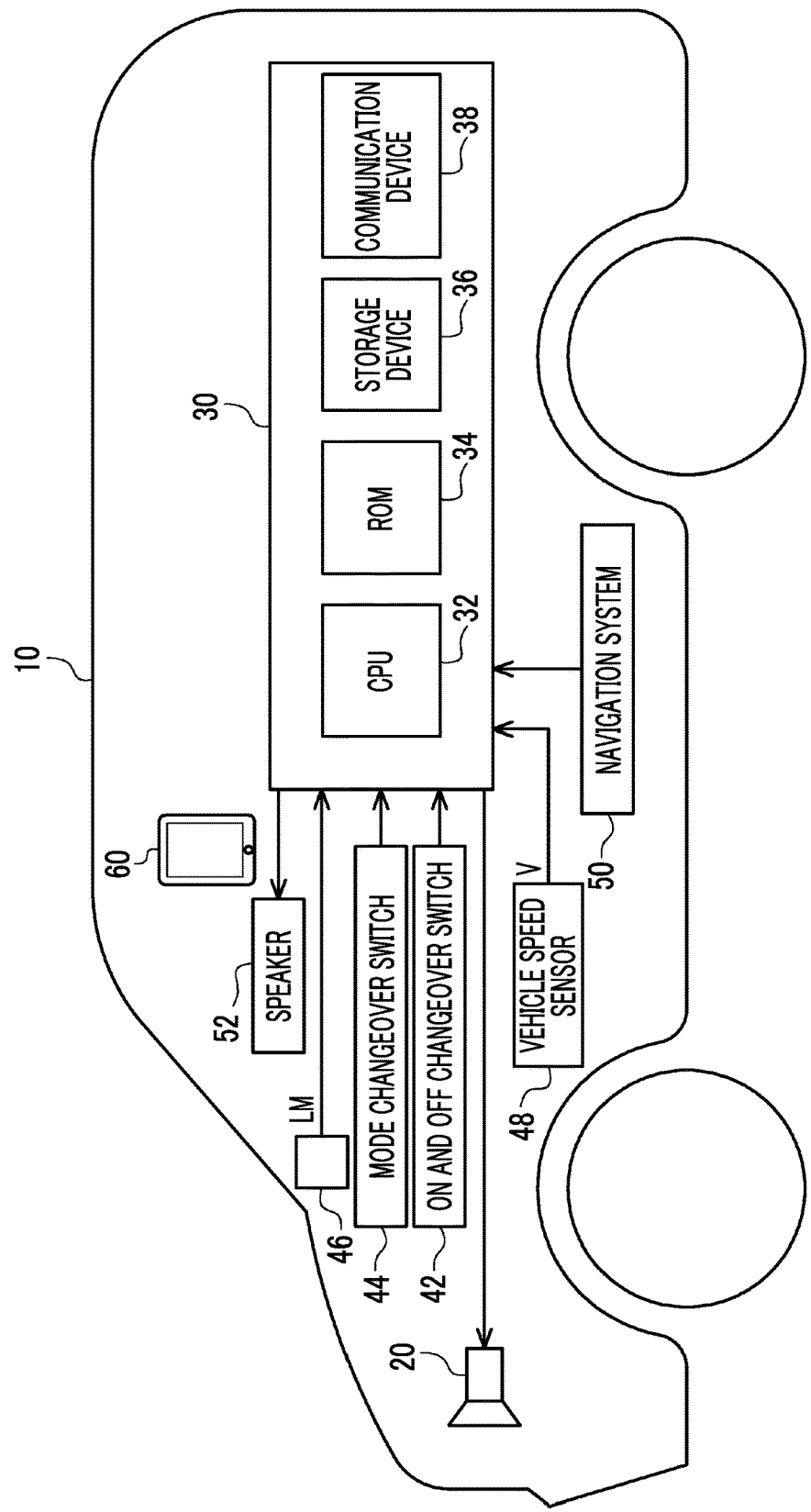
FIG. 1 is a diagram illustrating a vehicle according to a first embodiment.

A vehicle 10 illustrated in FIG. 1 is provided with a headlight 20 that illuminates the front in a traveling direction of the vehicle 10. Further, the vehicle 10 is provided with an electronic control unit (ECU 30). The ECU 30 sets the headlight 20 as a control target and executes control to switch the headlight 20 from one of an ON state and an OFF state to the other. The ECU 30 includes a CPU 32, a ROM 34 that stores programs executed by the CPU 32, a storage device 36, and a communication device 38. Here, the storage device 36 is a nonvolatile storage device which can electrically rewrite stored content.

The ECU 30 receives an output signal of an ON and OFF changeover switch 42 with which a user performs an instruction to switch the headlight 20 from one of the ON state and the OFF state to the other. The ECU 30 receives an output signal of a mode changeover switch 44 with which the user instructs switching between a manual mode in which the user performs an operation of the ON and OFF changeover switch 42 and an automatic mode in which the ECU 30 automatically switches the headlight 20 from one of the ON state and the OFF state the other, independently of the above operation. Further, the ECU 30 receives an illuminance LM around the vehicle 10 that is detected by an illuminance sensor 46 and a vehicle speed V that is detected by a vehicle speed sensor 48. Further, the ECU 30 can communicate with a navigation system 50 over a network in the vehicle, and output a voice signal to a speaker 52. Further, the ECU 30 can communicate with a mobile terminal 60 of the user using the communication device 38.

Figure 2:
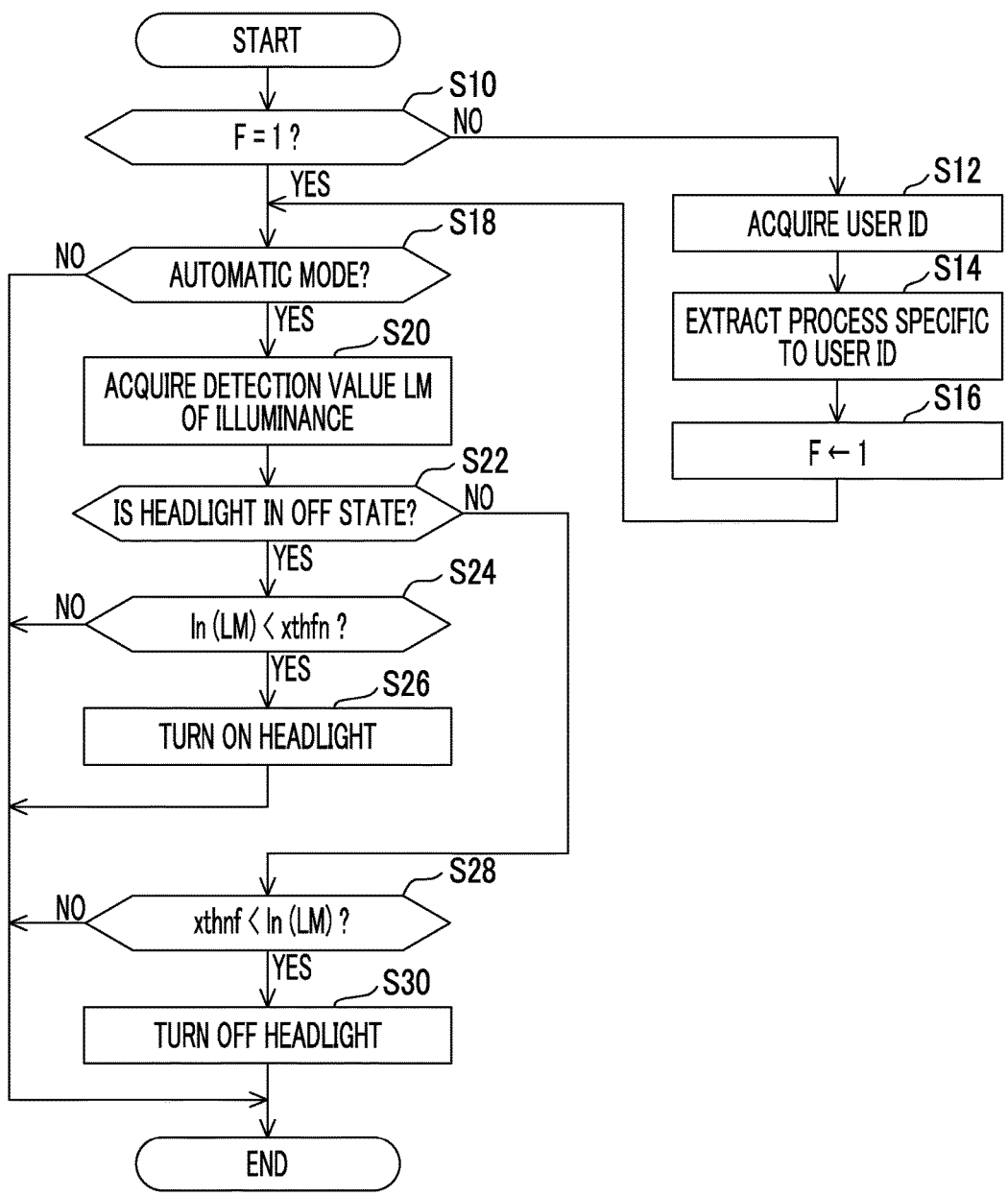
FIG. 2 is a flow diagram illustrating a procedure of a process in an automatic mode and preprocessing thereof according to the first embodiment.

FIG. 2 illustrates a procedure of a process in the automatic mode. The process illustrated in FIG. 2 is realized by the CPU 32 repeatedly executing the program stored in the ROM 34 in a predetermined period. Hereinafter, step numbers are represented by numerals beginning with "S".

In a series of processes illustrated in FIG. 2, the CPU 32 first determines whether or not a flag F is "1" (S10). The flag F is "1" when the user ID is acquired and is "0" when the user ID is not acquired. When the CPU 32 determines that the flag F is "0" (S10: NO), the CPU 32 acquires the user ID by communicating with the mobile terminal 60 using the communication device 38 (S12). This can be realized, for example, by installing a dedicated application program for causing the vehicle 10 to acquire the user ID in the mobile terminal 60. In the embodiment, a plurality of users is assumed to use the vehicle 10, and the users have different user IDs.

When the CPU 32 acquires the user ID, the CPU 32 extracts a process specific to the user ID (S14). Here, the data for switching the headlight 20 from one of the ON state and the OFF state to the other in the automatic mode is prepared as a process regarding FIG. 2, and data (described below) for generation of the data is set to be specific to the user ID. The CPU 32 sets the flag F to "1" (S16).

When the process of S16 is completed or when the determination is positive in S10, the CPU 32 determines whether or not the automatic mode is selected (S18). Then, when the CPU 32 determines that the automatic mode is selected (S18: YES), the CPU 32 acquires the illuminance LM (S20). The illuminance is quantified by Lux or a measurement unit proportional to the Lux. Then, the CPU 32 determines whether or not the headlight 20 is in the OFF state (S22). When the CPU 32 determines that the headlight 20 is in the OFF state (S22: YES), the CPU 32 determines whether or not a log value ln (LM) of the illuminance LM is smaller than an ON switching threshold value xthfn (S24). This process is intended to determine whether or not to turn on the headlight 20 automatically. Using the log value of the illuminance LM considers that vision of a person does not linearly react to the illuminance LM. When the CPU 32 determines that the log value ln (LM) is smaller than the ON switching threshold value xthfn (S24: YES), the CPU 32 turns on the headlight 20 (S26).

On the other hand, when the CPU 32 determines that the headlight is in an ON state (S22: NO), the CPU 32 determines whether or not the log value ln (LM) is greater than an OFF switching threshold value xthnf (S28). When the CPU 32 determines that the log value ln (LM) is greater than the OFF switching threshold value xthnf (S28: YES), the CPU 32 turns off the headlight 20 (S30).

When the process of step S30 is completed or when a negative determination is made in S18, S24, and S28, the CPU 32 temporarily ends the series of processes illustrated in FIG. 2. Then, calculation of the ON switching threshold value xthfn and the OFF switching threshold value xthnf will be described. The ON switching threshold value xthfn and the OFF switching threshold value xthnf are calculated based on set data including a label variable t indicating whether the headlight 20 is in the ON state or in the OFF state, and the log value (hereinafter, illuminance x) of the illuminance LM. The label variable t is "1" when the headlight 20 is in the ON state and "0" when the headlight 20 is in the OFF state. Incidentally, in the embodiment, the set data is associated with the user ID through the process of S12. The set data that is used for calculation of the ON switching threshold value xthfn and the OFF switching threshold value xthnf corresponding to a specific user ID is limited to the set data when the user with the user ID is using the vehicle 10.

Figure 3:
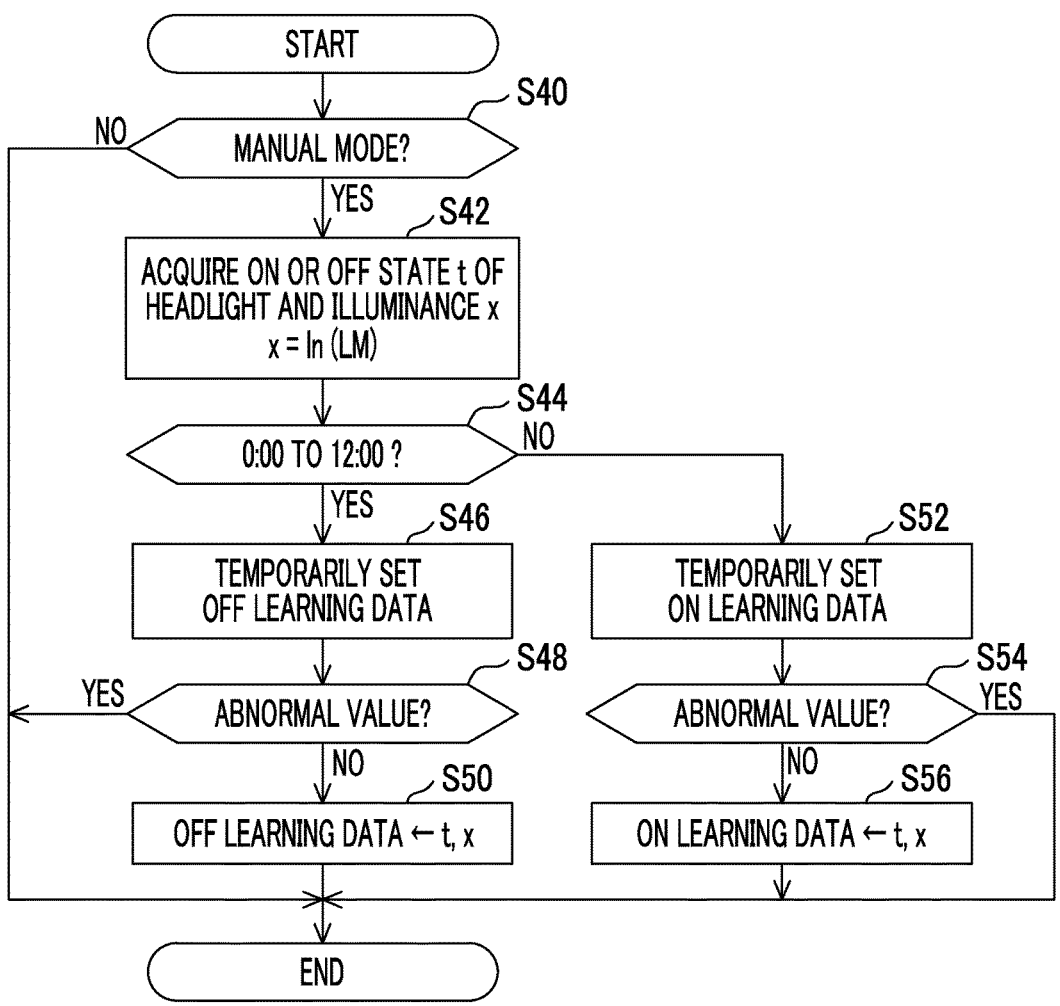
FIG. 3 is a flow diagram illustrating a procedure of a process of classifying set data according to the first embodiment.

FIG. 3 illustrates a procedure of a process of classifying the set data into ON learning data for calculating the ON switching threshold value xthfn and OFF learning data for calculating the OFF switching threshold value xthnf. The process illustrated in FIG. 3 is realized by the CPU 32 repeatedly executing the program stored in the ROM 34 in a predetermined period.

In a series of processes illustrated in FIG. 3, the CPU 32 first determines whether or not a mode is the manual mode (S40). This process is a process of determining whether or not it is time when acquisition of the ON learning data and the OFF learning data is to be performed. That is, in the embodiment, the ON switching threshold value xthfn and the OFF switching threshold value xthnf are learned through supervised learning in which the data group of the illuminance x when the manual mode is adopted is an input vector, and a data group of the label variable t is a target vector. Therefore, the manual mode is an execution condition for the process of acquiring the ON learning data and the OFF learning data.

When the CPU 32 determines that the mode is the manual mode (S40: YES), the CPU 32 acquires the label variable t indicating the ON or OFF state of the headlight 20 and the illuminance x(S42). Then, the CPU 32 determines whether or not a current time is "0:00 to 12:00" (S44). This process is a process of determining whether or not the current time is a period in which the illuminance x tends to increases. When the illuminance x tends to increase, the user generally tends to switch the headlight 20 from the ON state to the OFF state. Therefore, in the embodiment, the set data in the period in which the illuminance x tends to increase is set as OFF learning data.

When the CPU 32 determines that the current time is "0:00 to 12:00" (S44: YES), the CPU 32 temporarily sets the set data acquired in the process of S42 as the OFF learning data (S46). The CPU 32 determines whether or not the set data is an abnormal value based on an OFF switching probability function pnf(x) that is calculated through a process to be described below (S48). This process is intended to determine whether or not the set data acquired newly through the process of S42 may be adopted as learning data. This process is a process of determining that the set data is abnormal when the set data significantly deviate from probability prediction based on the OFF switching probability function pnf(x). Specifically, in the embodiment, the CPU 32 determines that the set data is abnormal when a negative log likelihood defined in Equation (c1) below is greater than the threshold value lnth.

$$-\ln \lfloor \text{pnf}(x)^t \cdot \{1-\text{pnf}(x)\}^{1-t} \rfloor \tag{c1}$$

When the set data indicates that the headlight 20 is in the ON state, the label variable t becomes "1", and therefore, the independent variable of the log function in Equation (c1) above becomes the OFF switching probability function pnf(x). Therefore, when the value of the dependent variable of the OFF switching probability function pnf(x) in which the illuminance x of the set data is an independent variable is relatively small, that is, a probability of the headlight 20 being in the ON state is meant to be relatively low, a negative log likelihood becomes a relatively great value. On the other hand, when the set data indicates that the headlight 20 is in the OFF state, the label variable t becomes "0", and therefore, the independent variable of the log function in Equation (c1) above becomes "1−pnf(x)". Therefore, when the value of the dependent variable of the OFF switching probability function pnf(x) in which the illuminance x in the set data is an independent variable is relatively great, that is, a probability of the headlight 20 being in the OFF state is meant to be relatively low, a negative log likelihood becomes a relatively great value. When the CPU 32 determines that the set data is not the abnormal value (S48: NO), the CPU 32 sets the set data as the OFF learning data (S50).

On the other hand, when the CPU 32 determines that the current time is "12:00 to 0:00" (S44: NO), the CPU 32 executes process corresponding to the processes of S46 to S50 in the processes of S52 to S56. That is, the CPU 32 first provisionally sets the set data acquired in the process of S42 as the ON learning data (S52). The CPU 32 determines whether or not the set data is an abnormal value based on the ON switching probability function pnf(x) that is calculated through a process described below (S54). Here, the CPU 32 determines whether or not the set data is an abnormal value based on whether or not a negative log likelihood in which the OFF switching probability function pnf(x) is replaced with the ON switching probability function pfn(x) in Equation (c1) is equal to or greater than the threshold value lnth. When the CPU 32 determines that the set data is not an abnormal value (S54: NO), the CPU 32 sets the set data as the ON learning data (S56).

Further, when the processes of S50 and S56 are completed, when the negative determination is made in S40, or when the positive determination is made in S48 and S54, the CPU 32 temporarily ends the series of processes illustrated in FIG. 3.

When the ON learning data is acquired through the above process, the ON switching probability function pfn(x) that is a function of a probability of the headlight 20 being in an ON state with respect to the illuminance x is learned based on the ON learning data in the embodiment. Here, in the embodiment, the ON switching class posterior probability pfn (t=1|x) that is a posterior probability of the label variable t becoming "1" is represented by a sigmoid function in which a value of a linear function of the illuminance x is an independent variable. Specifically, the ON switching class posterior probability pfn(t=1|x) is a function represented by Equation (c2) below in which a value obtained multiplying an inner product of an adjustment parameter vector Wfn= (wfn0, wfn1) and a vector (1, x) by "−1" is an independent variable.

$$pfn(t=1 \mid x) = \frac{1}{1 + e^{-(wfn0+wfn1 \cdot x)}} \tag{c2}$$

In the embodiment, the probability distribution of the adjustment parameter vector Wfn is updated by learning. That is, by calculating the posterior distribution on assumption that the prior distribution of the adjustment parameter vector Wfn is a Gaussian distribution N (Wfn|Mfn0, Sfn0), the probability distribution of the adjustment parameter vector Wfn is updated. The Gaussian distribution N (Wfn|Mfn0, Sfn0) is defined by the mean Mfn0 and the variance-covariance matrix Sfn0. When the learning has not yet been performed, a value derived based on big data, for example, is set as an initial value of the mean Mfn0 and the variance-covariance matrix Sfn0. Hereinafter, a procedure of this process will be described.

Figure 4:
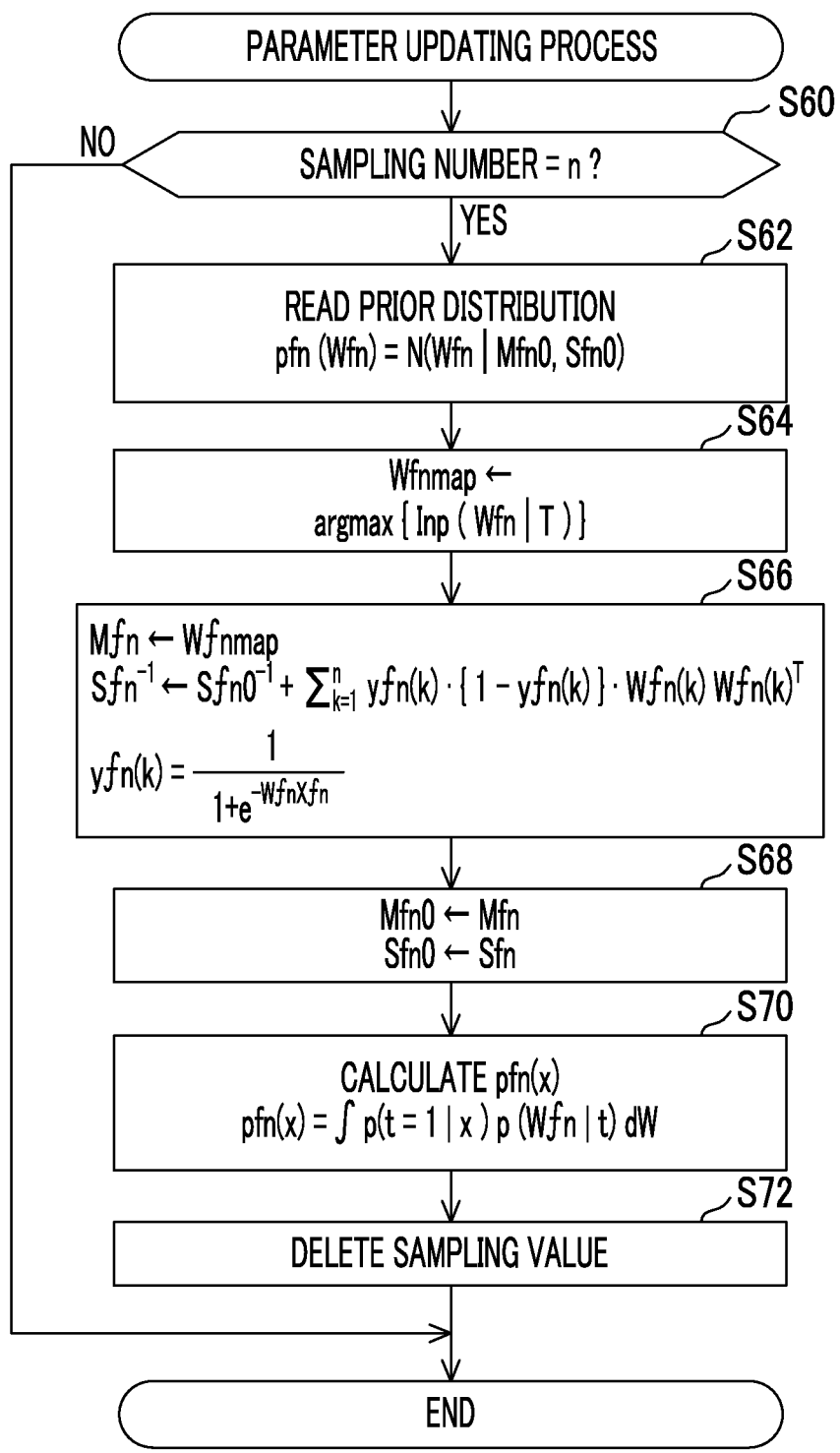
FIG. 4 is a flow diagram illustrating a procedure of a process of updating parameters according to the first embodiment.

FIG. 4 illustrates a procedure of calculation of the ON switching probability function pfn(x) using the ON learning data. The process illustrated in FIG. 4 is realized by the CPU 32 repeatedly executing the program stored in the ROM 34 in a predetermined period.

In a series of processes illustrated in FIG. 4, the CPU 32 first determines whether or not the sampling number of the ON learning data becomes n (S60). When the CPU 32 determines that the sampling number is n (S60: YES), the CPU 32 reads an ON switching prior distribution pfn(Wfn) that is a Gaussian distribution from the storage device 36 (S62). The CPU 32 calculates a MAP solution Wfnmap that is a value of the adjustment parameter vector Wfn for maximizing an ON switching posterior distribution pfn (Wfn|T) based on an input vector X={x(1), x(2), . . . , x(n)} including n pieces of set data and a label vector T={t(1), t(2), . . . , t(n)} (S64).

Here, a log value of the ON switching posterior distribution pfn(Wfn|T) is proportional to a log value lnp(Wfn|T) of a posterior distribution represented by Equation (c3) below according to the Bayes' theorem.

$$\ln p(Wfn|T) = \ln \lfloor N(Wfn|Mfn0,Sfn0)\Pi_{k=1}^{n} pfn \\ \{t=1|x(k)\}^{t(k)}[1-pfn\{t=1|x(k)\}]^{t(k)}\rfloor \tag{c3}$$

The CPU 32 calculates the adjustment parameter vector Wfn for maximizing the log value lnp(Wfn|T) of the posterior distribution as the MAP solution. This may be executed, for example, using a conjugate gradient descent method.

When the CPU 32 calculates the MAP solution Wfnmap, the CPU 32 assumes that the ON switching posterior distribution pfn(Wfn|T) is also the Gaussian distribution, and calculates a mean Mfn and a variance-covariance matrix Sfn (S66). The mean Mfn becomes the MAP solution Wfnmap. Further, the variance-covariance matrix is expressed by Equation (c4) below. However, yfn (k) is a value of the dependent variable in which the adjustment parameter vector Wfn of the sigmoid function is the MAP solution Wfnmap, and an independent variable of the sigmoid function is the illuminance x(k).

$$Sfn^{-1} \leftarrow Sfn0^{-1} + \Sigma_{k=1}^{n} yfn(k) \cdot \{1-yfn(k)\} \cdot Wfn(k)Wfn(k)^T \quad (c4)$$

Then, the CPU 32 updates a mean Mfn0 of the prior distribution stored in the storage device 36 into the mean Mfn, and updates the variance-covariance matrix Sfn0 of the prior distribution stored in the storage device 36 into the variance-covariance matrix Sfn (S68).

The CPU 32 integrates a product of the ON switching class posterior probability pfn(t=1|x) and the ON switching posterior distribution pfn(Wfn|T) with respect to the adjustment parameter vector Wfn to calculate the ON switching probability function pfn(x) (S70). The CPU 32 deletes the n sampling values (S72).

Figure 5:
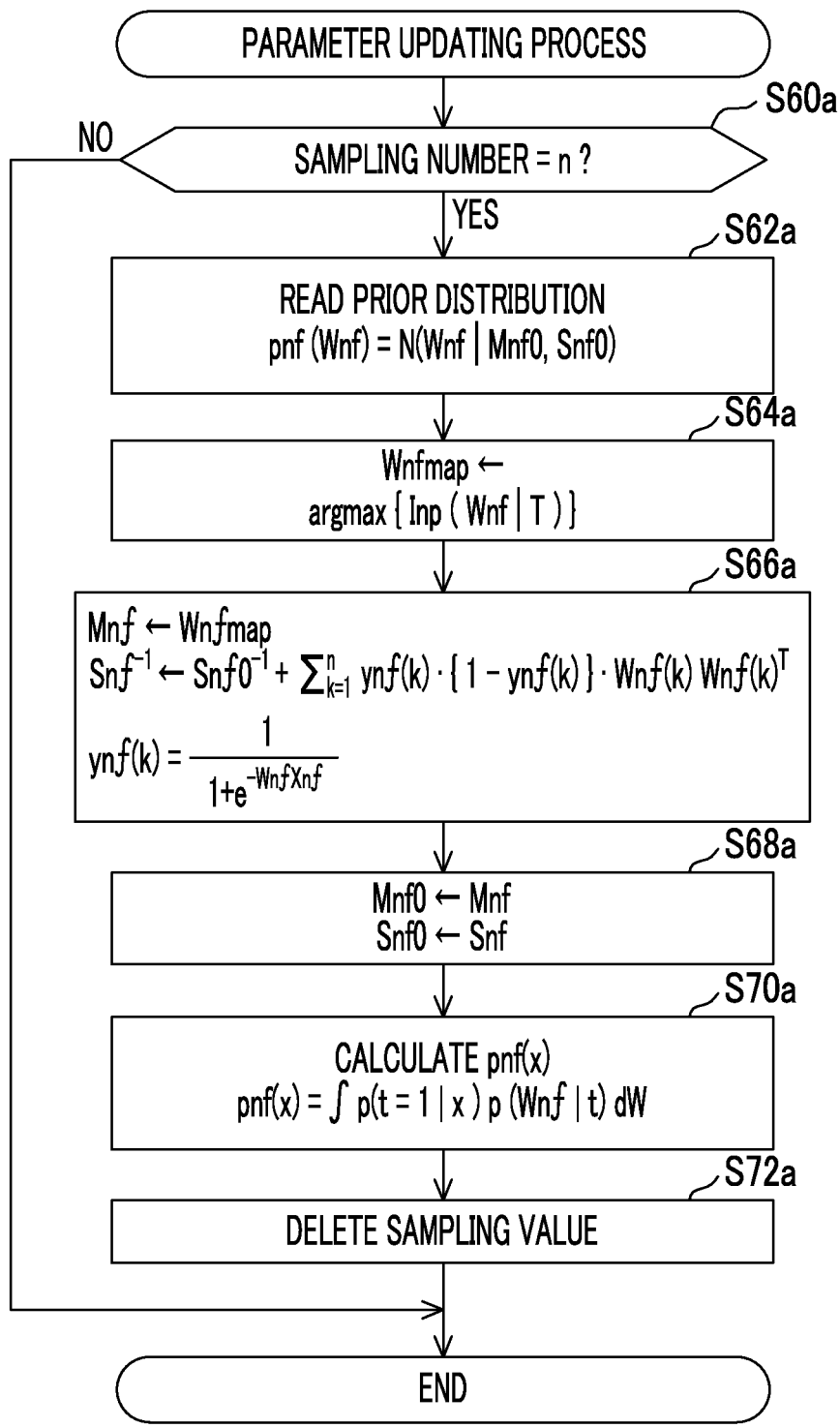
FIG. 5 is a flow diagram illustrating a procedure of a process of updating parameters according to the first embodiment.

When the process of S72 is completed or when a negative determination is made in step S60, the CPU 32 temporarily ends the series of processes illustrated in FIG. 4. FIG. 5 illustrates a procedure of calculation of the OFF switching probability function pnf(x) using the OFF learning data. The process illustrated in FIG. 5 is realized by the CPU 32 repeatedly executing the program stored in the ROM 34 in a predetermined period. The processes of S60a to S72a in FIG. 5 correspond to the processes of S60 to S72 in FIG. 4, and are the same as the processes of FIG. 4 except that data to be handled is for OFF switching.

Figure 6:
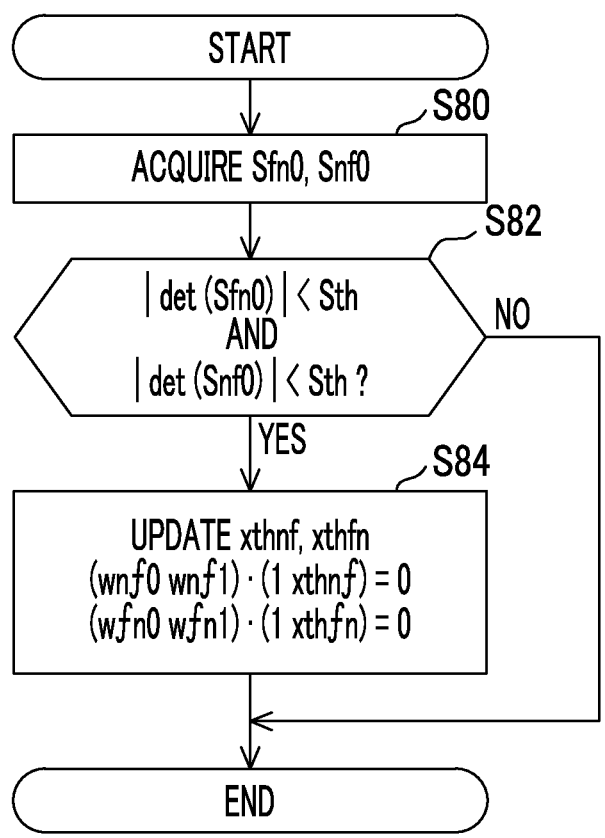
FIG. 6 is a flow diagram illustrating a procedure of a process of updating a switching threshold value according to the first embodiment.

FIG. 6 illustrates a procedure of updating the ON switching threshold value xthfn and the OFF switching threshold value xthnf. The process illustrated in FIG. 6 is realized by the CPU 32 repeatedly executing the program stored in the ROM 34 in a predetermined period.

In a series of processes illustrated in FIG. 6, the CPU 32 first reads the variance-covariance matrixes Sfn0, Snf0 regarding prior distributions of both ON switching and OFF switching from the storage device 36 (S80). The CPU 32 determines whether or not a logical product of an absolute value of a determinant of the variance-covariance matrix Sfn0 for ON switching is smaller than a threshold value Sth and an absolute value of the determinant of the variance-covariance matrix Snf0 for OFF switching is smaller than the threshold value Sth is true (S82). This process is intended to determine whether or not to update the ON switching threshold value xthfn and the OFF switching threshold value xthnf. That is, since the learning is considered to have converged when the absolute value of the determinant is smaller than the threshold value Sth, this is set as a condition for updating the ON switching threshold value xthfn and the OFF switching threshold value xthnf. Incidentally, the variance-covariance matrixes Sfn0, Snf0 previously stored by default before learning is performed are assumed to be set to the value negatively determined in S82.

When the CPU 32 determines that the logical product is true (S82: YES), the CPU 32 updates the ON switching threshold value xthfn and the OFF switching threshold value xthnf (S84). In the embodiment, the ON switching threshold value xthfn is the illuminance x when the ON switching probability function pfn(x) is "1/2", and the OFF switching threshold value xthnf is the illuminance x when the OFF switching probability function pnf(x) is "1/2". Here, in the embodiment, in the processes of S70, S70a, the ON switching probability function pfn(x) and the OFF switching probability function pnf(x) approximate to the sigmoid function. In this case, an independent variable of the sigmoid function can be expressed as cWfnX, cWnfX using a constant c (see, for example, Chapter 4 in "Pattern Recognition and Machine Learning: C. M. Bishop"). Therefore, the illuminance x when the probability becomes "1/2" can be obtained as the illuminance x in which an inner product of the MAP solutions Wfnmap, Wnfmap calculated in S64 and S64a and (1, x) is "0".

Figure 7:
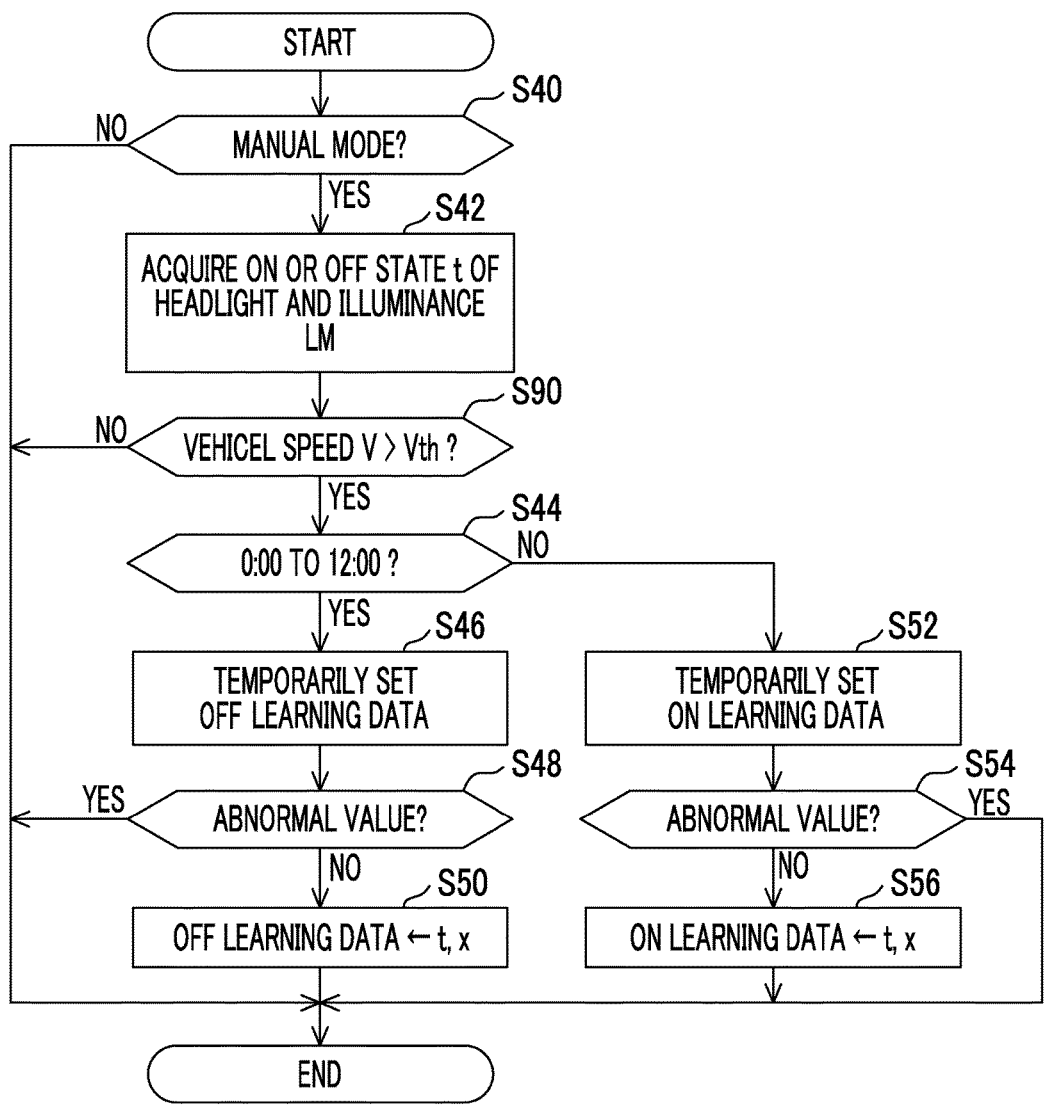
FIG. 7 is a flow diagram illustrating a procedure a process of classifying set data according to a second embodiment.

Further, the CPU 32 temporarily ends the series of processes illustrated in FIG. 7 when the process of S84 is completed or when a negative determination is made in S82. Incidentally, when the CPU 32 makes the negative determination is made in S82, the CPU 32 may use default values as the ON switching threshold value xthfn and the OFF switching threshold value xthnf. The default values may be stored, for example, in the ROM 34 in advance.

An operation of the embodiment will be described herein. When the user gets on the vehicle 10 and selects the manual mode, the CPU 32 performs sampling using whether the headlight 20 is in the ON state or the OFF state as the label variable t at each periodic sampling timing set independently of the operation of the ON and OFF changeover switch 42, and samples the illuminance x at that time. Here, at a point in time at which the CPU 32 samples n pieces of set data of "0:00 to 12:00", the CPU 32 calculates the MAP solution Wfnmap of the log lnp (Wfn|T) of the posterior distribution that is represented by Equation (c3) above.

Here, in a case where a proportion of the set data with which the headlight 20 is in the ON state in a predetermined illuminance area among the n pieces of set data is relatively high, the ON switching class posterior probability pfn(t=1|x) increases the probability of the headlight 20 entering the ON state in the predetermined illuminance area, as compared with a case where the proportion of the set data with which the headlight 20 is in the ON state is relatively low. Accordingly, a log lnp (Wfn|T) of the posterior distribution is increased. Therefore, the MAP solution Wfnmap is a value with which the ON switching class posterior probability pfn(t=1|x) increases the probability of the headlight 20 entering the ON state in the predetermined illuminance area.

Since the ON switching posterior distribution pfn(Wfn|T) is obtained by averaging the MAP solution Wfnmap calculated in this way, the ON switching probability function pfn(x) is a function in which a distribution of the adjustment parameters is particularly high in the vicinity of the MAP solution Wfnmap. Thus, in a case where a proportion of the set data with which the headlight 20 is in the ON state is relatively high in a predetermined illuminance area among n pieces of set data, the ON switching probability fpfn(x) tends to increase the probability of the headlight 20 entering the ON state in the predetermined illuminance area, as compared with a case where the proportion of the set data with which the headlight 20 is in the ON state is relatively low. Therefore, a tendency of the user switching the headlights 20 from the OFF state to the ON state is reflected in the ON switching probability function pfn(x). Similarly, a tendency of the user switching the headlights 20 from the ON state to the OFF state is reflected in the OFF switching probability function pnf(x). Accordingly, the switching timing can be learned without detecting the timing at which the user switches the headlight from one of the ON state and the OFF state to the other in the manual mode.

Further, in the illuminance area in which there is solely data with which the headlight 20 is in the ON state among the n pieces of set data, the log lnp (Wfn|T) of the posterior distribution is increased by the ON switching class posterior probability pfn(t =1|x) increasing the probability of the headlight 20 entering the ON state. Therefore, the MAP solution Wfnmap is a value with which the ON switching class posterior probability pfn(t=1|x) increases a probability of the headlight 20 entering the ON state in the illuminance area. On the other hand, in the illuminance area in which there is solely data with which the headlight 20 is in the OFF state among the n pieces of set data, the log lnp (Wfn|T) of the posterior distribution is increased by the ON switching class posterior probability pfn(t=1|x) increasing the probability of the headlight 20 entering the OFF state. Therefore, the MAP solution Wfnmap is a value with which the ON switching class posterior probability pfn(t=1|x) increases a probability of the headlight 20 entering the OFF state in the illuminance area. In this case, in an illuminance area in which the set data with which the headlight 20 is in the ON state and the set data with which the headlight 20 is in the OFF state among the n pieces of set data coexist, the probability of the headlight 20 entering the ON state based on the ON switching class posterior probability pfn(t=1|x) becomes an intermediate value. Therefore, in a case where the illuminance x when the value of the ON switching probability function pfn(x) becomes "1/2" is used as the ON switching threshold value xthfn, the ON switching threshold value xthfn tends to be a value in an area of the illuminance x in which the set data with which the headlight 20 is in the ON state and the set data with which the headlight 20 is in the OFF state coexist. Similarly, the OFF switching threshold value xthnf tends to be a value in an area of the illuminance x in which the set data with which the headlight 20 is in the ON state and the set data with which the headlight 20 is in the OFF state coexist.

According to the embodiment described above, the following effects are also obtained. (1) The set data are classified into the ON learning data and the OFF learning data based on a time zone. Accordingly, it is possible to easily determine whether each piece of set data contributes to the ON switching probability function pfn(x) or contributes to the OFF switching probability function pnf(x).

(2) the CPU 32 determines whether or not the set data is an abnormal value based on the ON switching probability function pfn(x) or the OFF switching probability function pnf(x), and does not reflect the set data in learning when the set data is the abnormal value. Thus, it is possible to suppress a situation in which learning is performed using inappropriate data that does not reflect a tendency of the user.

Second Embodiment

Hereinafter, differences between a second embodiment and the first embodiment will be mainly described with reference to the drawings.

For example, in a case where there is an oncoming vehicle when the vehicle 10 is stopped at an intersection, some of users may be aware of the oncoming vehicle and perform an operation of switching the headlight 20 from the ON state to the OFF state. This switching operation is different from a normal tendency in which the user switches the headlight 20 from the ON state to the OFF state. Therefore, in the embodiment, use of the set data to which such an operation has been reflected for learning is suppressed by the following process.

FIG. 7 illustrates a procedure of a process of classifying the set data into ON learning data and OFF learning data. The process illustrated in FIG. 7 is realized by the CPU 32 repeatedly executing the program stored in the ROM 34 in a predetermined period. In FIG. 7, processes corresponding to the processes illustrated in FIG. 3 are denoted by the same step numbers for convenience and description thereof is omitted.

In a series of processes illustrated in FIG. 7, the CPU 32 determines whether or not the vehicle speed V is higher than a threshold value Vth when the process of S42 is completed (S90). This process is intended to determine that the vehicle 10 is stopped, and the threshold value Vth is set to a very low speed value. The CPU 32 temporarily ends the series of processes illustrated in FIG. 7 when the CPU 32 determines that the vehicle speed V is equal to or lower than the threshold value Vth (S90 NO), and proceeds to the process of S44 when the CPU 32 determines that the vehicle speed V is higher than the threshold value Vth (S90: YES).

Third Embodiment

Hereinafter, differences between the third embodiment and the first embodiment will be mainly described with reference to the drawings.

For example, when the vehicle 10 reaches a tunnel, a phenomenon that the headlight 20 is turned ON may occur. When learning is performed using the set data when such a phenomenon occurs, a tendency different from an original tendency of an ON and OFF switching operation of the headlight 20 of the user is likely to be learned.

Further, for example, when the vehicle 10 passes through the vicinity of a relatively high building, the illuminance may be rapidly decreased due to a shadow of the building. Further, for example, when the vehicle 10 passes through the vicinity of a building such as a commercial facility using a plurality of illuminations, the illuminance around the vehicle 10 may be rapidly increased. Thus, when the illuminance around the vehicle 10 is rapidly changed, the user is likely to perform an ON and OFF operation of the headlight with a tendency different from an original tendency of the ON and OFF switching operation of the headlight 20.

Figure 8:
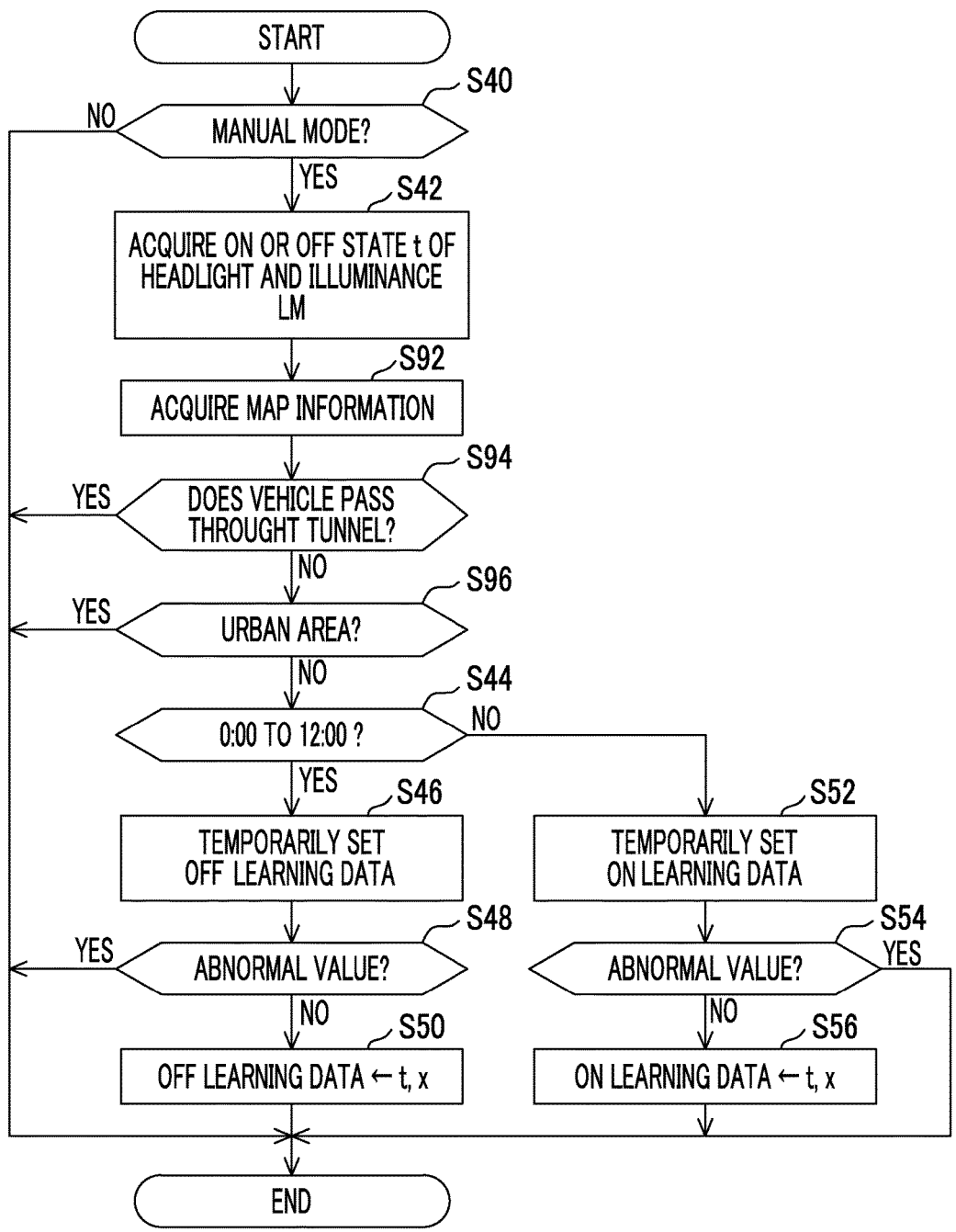
FIG. 8 is a flow diagram illustrating a procedure a process of classifying set data according to a third embodiment.

In the embodiment, use of data in which such an operation has been reflected for learning is suppressed through the following process. FIG. 8 illustrates a procedure of a process of classifying the set data into ON learning data and OFF learning data. The process illustrated in FIG. 8 is realized by the CPU 32 repeatedly executing the program stored in the ROM 34 in a predetermined period. In FIG. 8, processes corresponding to the processes illustrated in FIG. 3 are denoted by the same step numbers for convenience and description thereof will be omitted.

In a series of processes illustrated in FIG. 8, when the process of S42 is completed, the CPU 32 communicates with the navigation system 50 to acquire map information (S92). The CPU 32 determines whether or not the vehicle 10 passes through a tunnel based on the map information (S94). Here, the CPU 32 sets a point separated by a predetermined distance further upstream from an end upstream of the tunnel to a start point, and sets a point separated by a predetermined distance further downstream from an end downstream of the tunnel to an end point, and determines that the vehicle 10 passes through the tunnel when the vehicle 10 is traveling in a section between the start point and the end point. When the CPU 32 determines that the vehicle does not pass through the tunnel (S94: NO), the CPU 32 determines whether or not the vehicle travels in an urban area based on the map data (S96). This process is intended to determine whether or not the vehicle 10 travels at a point at which the illuminance around the vehicle 10 is likely to be abruptly changed. When the CPU 32 determines that the vehicle does not travel in the urban area (S96: NO), the CPU 32 proceeds to the process of S44. When a positive determination is made through the processes of S94, S96, the CPU 32 temporarily ends the series of processes illustrated in FIG. 8.

Fourth Embodiment

Hereinafter, differences between a fourth embodiment and the first embodiment will be mainly described with reference to the drawings.

Figure 9:
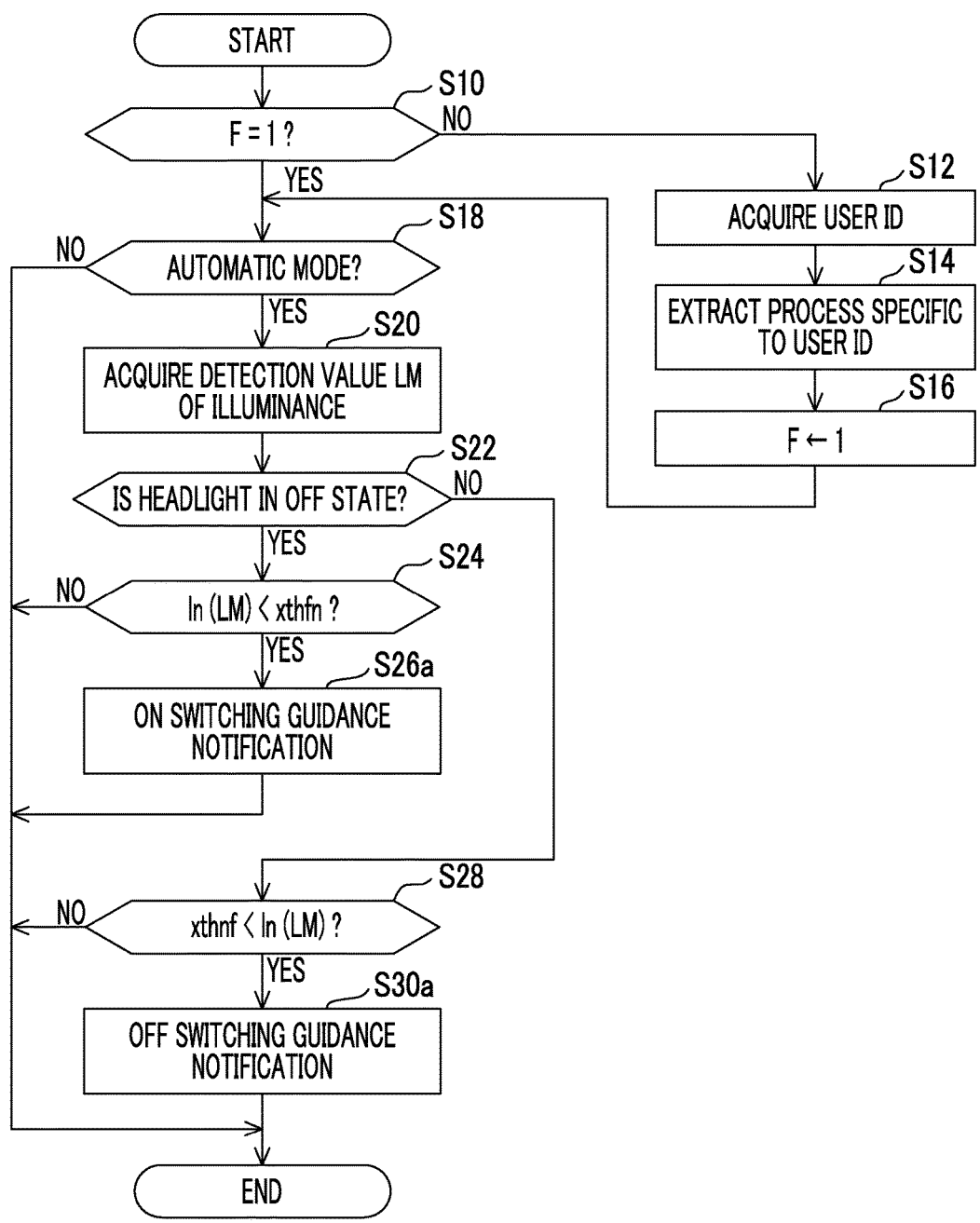
FIG. 9 is a flow diagram illustrating a procedure of a process in an automatic mode and preprocessing thereof according to a fourth embodiment.

In the embodiment, a process of guiding the user to operate the ON and OFF changeover switch 42 by himself/herself is executed in the automatic mode. FIG. 9 illustrates a procedure of a process in the automatic mode. The process illustrated in FIG. 9 is realized by the CPU 32 repeatedly executing the program stored in the ROM 34 in a predetermined period. In FIG. 9, processes corresponding to the processes illustrated in FIG. 2 are denoted by the same step numbers for convenience, and description thereof will be omitted.

In a series of processes illustrated in FIG. 9, when the CPU 32 makes a positive determination in S24, the CPU 32 outputs a voice guidance signal for switching the headlight 20 for the user to the ON state to the speaker 52 (S26a). Accordingly, an audio signal "Why not turn on the headlight? It becomes dark" is output from the speaker 52 and notified to the user. Further, when the CPU 32 makes a positive determination in S28, the CPU 32 outputs a voice guidance signal for switching the headlight 20 to the OFF state to the speaker 52 for the user (S30a). Accordingly, the audio signal "Do not forget to turn off the headlight?" is output from the speaker 52 and is notified to the user.

The processes of steps S40 and S42 function as the acquisition, and the processes of S44 to S56 in FIG. 3 or the processes of FIGS. 4 to 6 function as the generation of the control data. The process of S22 to S30 in FIG. 2 or processes of S22, S24, S26a, S28, and S30a in FIG. 9 function as automatic mode. The ON switching threshold value xthfn, the OFF switching threshold value xthnf, the variance-covariance matrixes Sfn0, Snf0, and the means Mfn0, Mnf0 function as the control data. The speaker 52 functions as the notification device. The CPU 32 and the ROM 34 function as the electronic control unit. The ECU 30 functions as the headlight control data generation device. The variance-covariance matrix Sfn0 and the mean Mfn0 function as the data regarding the ON switching probability information, and the variance-covariance matrix Snf0 and the mean Mnf0 function as the data regarding the OFF switching probability information. The process of S90 functions as the determination as to whether or not the traveling speed of the vehicle is equal to or lower than the threshold value. The processes of S92 and S94 function as the determination as to whether the vehicle passes through the tunnel. The processes of S92 and S96 function as the determination as to whether or not there is a predetermined building within a predetermined distance from the vehicle. The ECU 30 functions as the vehicle control device. The processes of S40 and S42 function as the acquisition, and the processes of S44 to S56 in FIG. 3 or the processes of FIGS. 4 to 6 function as generation of the control data. The processes of S22 to S30 in FIG. 2 function as automatic mode, or the processes of S22, S24, S26a, S28, and S30a in FIG. 9 function as automatic mode. The CPU 32 and the ROM 34 function as the electronic control unit. The ECU 30 functions as the headlight control data generation device. The ECU 30 functions as the vehicle control device.

Other Embodiments

At least one of the respective items of the above embodiment may be modified as follows.

Derivation of ON Switching Threshold Value xthfn, OFF Switching Threshold Value xthnf Based on Probability Function In the above embodiment, the ON switching threshold value xthfn has been the illuminance x when the ON switching probability function pfn(x) becomes "1/2", but the present disclosure is not limited thereto. For example, the ON switching threshold value xthfn may be an illuminance x when the ON switching probability function pfn(x) becomes "2/3". In this case, the ON switching threshold value xthfn tends to be a value in an area of the illuminance x in which the set data with which the headlight 20 is in the ON state and the set data with which the headlight 20 is in the OFF state coexist.

In the above embodiment, the OFF switching threshold value xthnf has been the illuminance x when the OFF switching probability function pnf(x) becomes "1/2", but the present disclosure is not limited thereto. For example, the OFF switching threshold value xthnf may be an illuminance x when the OFF switching probability function pnf(x) becomes "2/3". In this case, the OFF switching threshold value xthnf tends to be a value in an area of the illuminance x in which the set data with which the headlight 20 is in the ON state and the set data with which the headlight 20 is in the OFF state coexist.

ON Switching Class Posterior Probability and OFF Switching Class Posterior Probability In the above embodiment, the ON switching class posterior probability pfn(t=1|x) may be represented by a sigmoid function, and the independent variable of the sigmoid function is a linear function of the illuminance x, but the present disclosure is not limited thereto, and the independent variable may be a linear function of the illuminance LM. Further, the ON switching class posterior probability pfn(t=1|x) is not limited to solely the illuminance as a measured value being the parameter for determining the independent variable. For example, weather information, road type information, or illuminance information inside the vehicle may be included in the parameter.

In the above embodiment, the OFF switching class posterior probability pnf(t=1|x) may be represented by a sigmoid function, and the independent variable of the sigmoid function is a linear function of the illuminance x, but the present disclosure is not limited thereto, and the independent variable may be a linear function of the illuminance LM. Further, the OFF switching class posterior probability pnf(t=1|x) is not limited to solely the illuminance as a measured value being the parameter for determining the independent variable. For example, weather information, road type information, or illuminance information inside the vehicle may be included in the parameter.

On Switching Probability Function and OFF Switching Probability Function

In the above embodiment, the ON switching probability function pfn(x) has been calculated based on the ON switching posterior distribution pfn(Wfn|T) in the process of S70, this process may be deleted. In this case, for example, a sigmoid function in which the adjustment parameter vector Wfn of the sigmoid function has been substituted by the MAP solution Wfnmap calculated in S66 may be substituted by the ON switching probability function pfn(x) in the process of S54. Further, for example, the process of S54 may be deleted.

Further, the ON switching class posterior probability pfn(t=1|x) is not used, the ON switching probability function pfn(x) may be set as the sigmoid function using the adjustment parameter vector Wfn, and the adjustment parameter vector Wfn may be directly fitted based on the set data. This can be realized by updating "wfn0" into "c0·{t−pfn(x)}" using a coefficient c0 and updating "wfn1" into "c1·{t−pfn(x)}·x" using a coefficient c1.

In the above embodiment, the OFF switching probability function pnf(x) has been calculated based on the OFF switching posterior distribution pnf(Wnf|T) in the process of S70a, this process may be deleted. In this case, for example, a sigmoid function in which the adjustment parameter vector Wnf of the sigmoid function is the MAP solution Wnfmap calculated in the process of S66a may be substituted by the OFF switching probability function pnf(x) in the process of S48. Further, for example, the process of S48 may be deleted.

Further, the OFF switching class posterior probability pnf (t=1|x) is not used, the OFF switching probability function pnf(x) may be set as the sigmoid function using the adjustment parameter vector Wnf, and the adjustment parameter vector Wnf may be directly fitted based on the set data. This can be realized by updating "wnf0" into "c0·{t−pnf(x)}" using the coefficient c0 and updating "wnf1" into "c1·{t−pnf(x)}·x" using the coefficient c1.

ON Switching Posterior Distribution and OFF Switching Posterior Distribution

In the above embodiment, the ON switching prior distribution and the OFF switching prior distribution have been updated by updating the means Mnf0, Mfn0 and the variance-covariance matrixes Snf0, Sfn0 through the processes of S68 and S68a, but the present disclosure is not limited thereto. For example, the processes of S72 and S72a are deleted, and the ON switching posterior distribution and the OFF switching posterior distribution are calculated using the n pieces of set data. Then, in a case where the n pieces of set data are gathered again, when the ON switching posterior distribution and the OFF switching posterior distribution are calculated based on the 2n pieces of set data, it is not necessary to update the ON switching prior distribution and the OFF switching prior distribution.

Building Determination

In the third embodiment, the CPU 32 determines whether or not the vehicle 10 has entered the urban area as a case where the vehicle 10 enters an area within a predetermined distance from a building that causes a rapid change in the illuminance around the vehicle 10, but the present disclosure is not limited thereto. For example, when detailed map information can be acquired, it may be determined whether or not a distance from the building is within a predetermined distance by acquiring positional information of a building having a height equal to or greater than a predetermined value. Further, for example, when the detailed map information can be acquired, it may be determined whether or not a distance from the commercial facility is within a predetermined distance by obtaining positional information of the commercial facility.

Set Data Used for Learning

In the processes of S48 and S54, it is not essential to use the log likelihood. For example, the CPU 32 may determine that the set data is the abnormal value when an absolute value of a difference between the label variable t and the OFF switching probability function pnf(x) is relatively greater in the process of S48.

For example, in the processes of S48 and S54, when the negative log likelihood is smaller than a predetermined value smaller than the threshold value lnth, an influence on changing of the ON switching probability function pfn(x) and the OFF switching probability function pnf(x) is relatively less, and the set data may not be used for learning. Thus, it is possible to reduce a calculation load on the CPU 32.

Further, for example, a method of executing the process of S90, the process of S94, and the process of S96 is not limited to that illustrated in the second or third embodiment and, in short, the method may be a method of executing at least one of the three processes.

Illuminance Information Indicating Whether Illuminance Tends to Increase or Decrease In the above embodiment, when the current time is "0:00 to 12:00", the set data is classified into the OFF learning data and, otherwise, the set data is classified into the ON learning data, but the present disclosure is not limited thereto. For example, when the current time is "4:00 to 12:00", the set data is classified into the OFF learning data, when the current time is "15:00 to 20:00", the set data is classified into the ON learning data, and the set data in the other time zone may belong to both of the OFF learning data and the ON learning data. In other words, a percentage of contribution to the OFF switching posterior distribution pnf (Wnf|T) of the set data in the other time zone and a percentage of contribution to the ON switching posterior distribution pfn (Wfn|T) of the set data may both be 50%.

The information on the illuminance indicating whether illuminace tends to increase or tends to decrease is not limited to information on a time zone in which the set data is acquired. For example, weather information may be included, in addition to the time zone. Accordingly, in a time zone such as "10:00 to 15:00" in which a change in illuminance is considered to be relatively small when weather is fine, when the weather information is, for example, information indicating that the weather rapidly deteriorates from fine weather, the weather information can be information indicating that the illuminance becomes low, and set data acquired during this period can be classified into the ON learning data.

Illuminance Information

The information on the illuminance for determining a percentage of contribution to the data regarding the ON switching probability information of the set data and a percentage of contribution to the data regarding the OFF switching probability information of the set data is not limited to information indicating that the illuminance increases or decreases. For example, the information on the illuminance may be the luminance x associated with the label variable t. This can be performed as follows using, for example, a mixture model.

A probability function p(x) of the headlight entering an ON state with respect to the illuminance x is defined as "$p(x)=[\pi 1 \cdot pfn(x) + \pi 2 \cdot pnf(x)]$" as the mixture model of the ON switching probability function pfn(x) and the OFF switching probability function pnf(x) using weighting coefficients $\pi 1$ and $\pi 2$. However, "$\pi 1 + \pi 2 = 1$". Here, the ON switching probability function pfn(x) and the OFF switching probability function pnf(x) may be a sigmoid function using the adjustment parameter vectors Wfn and Wnf. Here, a likelihood function P of Equation (c5) below is defined.

$$P = \prod_{k=1}^{n} (\pi 1 \cdot pfn\{x(k)\}^{t(k)}[1 - pfn\{x(k)\}]^{1-t(k)} + \pi 2 \cdot pnf\{x(k)\}^{t(k)}[1 - pnf\{x(k)\}]^{1-t(k)}) \quad (c5)$$

By maximizing the likelihood function P using a known EM algorithm, both of the weighting coefficients $\pi 1$ and $\pi 2$ and the adjustment parameter vectors Wfn and Wnf are calculated. In the EM algorithm, when the set data (x, t) is given, a percentage of contribution to the ON switching probability function pfn(x) of the set data and a percentage of contribution to the OFF switching probability function pnf(x) of the set data are determined according to whether the set data is fit using any one of the ON switching probability function pfn(x) and the OFF switching probability function pnf(x). A mixture expert model can be constructed by setting the weighting coefficients π1 and π2 as a function of the illuminance x.

Incidentally, in the mixture model or the mixture expert model, information indicating whether the illuminance increases or decreases may be added. In the mixture expert model, when the information indicating whether or not the illuminance increases or decreases is added, it is effective for the weighting coefficients π1 and π2 to be a function of time in place of the illuminance x. However, the weighting coefficients π1 and π2 may be a function of both of the time and the illuminance.

Update of ON Switching Threshold Value xthfn and OFF Switching Threshold Value xthnf.

In the above embodiment, a determination as to whether or not an updating condition is satisfied based on the absolute value of the variance-covariance matrixes Sfn0, Snf0 is made, but the present disclosure is not limited thereto. For example, it may be determined whether or not the updating condition is satisfied by determining a degree of variation in the adjustment parameter based on an eigenvalue and an eigenvector of the variance-covariance matrixes Sfn0, Snf0.

Generation of Control Data

In the embodiment, the class posterior probability of the headlight entering the ON state is represented by the sigmoid function, but the present disclosure is not limited thereto, and the class posterior probability of the headlight entering the OFF state may be represented by the sigmoid function. Further, the present disclosure is not limited to the use of the sigmoid function and, for example, a probit function may be used.

Further, the present disclosure is not limited to the use of the function representing the probability of the headlight entering the ON state or the OFF state. For example, an area of values that may be taken by the illuminance x may be divided into a plurality of areas, the number of set data with which the headlight enters the ON state in each area may be recorded, and a map defining a probability of the headlight entering the ON state may be created using a ratio of the number of set data with which the headlight enters the ON state in each area to a total number of set data. In this case, the total number of set data used to create the map increases as learning proceeds. Incidentally, two maps including a map based on the set data when the illuminance tends to decrease and a map based on the set data when the illuminance tends to increase may be prepared, the former may be used as a map for ON switching, and the latter may be used as a map for OFF switching. Incidentally, in this case, it is conceivable that the ON switching threshold value xthfn generated based on the map for ON switching is a value in the illuminance area in which the set data with which the headlight 20 enters the ON state and the set data with which the headlight 20 enters the OFF state coexist. Similarly, it is conceivable that the OFF switching threshold value xthnf generated based on the map for OFF switching is a value in the illuminance area in which the set data with which the headlight 20 enters the ON state and the set data with which the headlight 20 enters the OFF state coexist.

However, the present disclosure is not limited to the process of generating the ON switching probability information and the OFF switching probability information. For example, data having single information indicating the probability of the headlight entering the ON state or the OFF state according to the illuminance x may be generated, and in the data, a value obtained by adding a predetermined amount Δ to the illuminance x0 when the probability of the headlight entering the ON state becomes "1/2" may be used as the ON switching threshold value xthfn, and a value obtained by subtracting the predetermined amount Δ from the illuminance x0 may be used as the OFF switching threshold value xthnf.

Further, the present disclosure is not limited to the generation of the probability information, and a process of specifying an area in which set data with which the headlight 20 enters the ON state and set data with which the headlight 20 enters the OFF state coexist by dividing an area of values that the illuminance x can take into a plurality of areas, and recording the number of pieces of set data with which the headlight 20 enters the ON state and the number of pieces of set data with which the headlight 20 enters the OFF state in each area may be executed. That is, in this case, for example, the ON switching threshold value xthfn and the OFF switching threshold value xthnf may be set at a center of the area in which both of the set data coexist. Specifically, the set data may be classified into the ON learning data and the OFF learning data, the numbers of pieces of set data belonging to the respective areas independently of each other in the ON learning data and the OFF learning data may be recorded, the ON switching threshold value xthfn may be generated from the ON learning data, and the OFF switching threshold value xthnf may be generated from the OFF switching data. However, the classification into the ON learning data and the OFF learning data is not performed and, for example, in the area in which both of the set data with which the headlight 20 enters the ON state and the set data with which the headlight 20 enters the OFF state coexist, illuminance higher than that at a center thereof may be used as the ON switching threshold value xthfn, and in the area in which both of the set data with which the headlight 20 enters the ON state and the set data with which the headlight 20 enters the OFF state coexist, illuminance lower than that at the center thereof may be used as the OFF switching threshold value xthnf.

Automatic Mode

In the example illustrated in FIG. 9, the voice guidance has been executed as the guidance process, but the present disclosure is not limited thereto. For example, visual information representing content of the guidance may be displayed as a virtual image in front of a windshield using a head-up display.

Further, the present disclosure is not limited to performing one of the automatic switching and the guidance process. For example, when the CPU 32 makes a positive determination in S24 of FIG. 2, the CPU 32 may first output an audio signal "Can the headlight 20 be lit?" from the speaker 52, and automatically switch the headlight 20 from the OFF state to the ON state when the user performs a positive response, for example, using a voice recognition function.

Vehicle Control Device

In the above embodiments, the headlight control data generation device and the device that executes the automatic mode have been the same ECU 30, but the present disclosure is not limited thereto. For example, a device that executes the automatic mode may be another ECU in the vehicle. Further, the headlight control data generation device and the device that executes the automatic mode are not necessarily mounted on the vehicle 10. For example, the headlight control data generation device may be an external device that receives the set data from the vehicle 10 through communication with the vehicle 10 and generates the headlight control data based on the set data. In this case, the headlight control data that the external device outputs to the vehicle 10 may be the ON switching threshold value xthfn and the OFF switching threshold value xthnf.

Further, the external device may be a large computer which collects and analyzes big data that is the set data of a plurality of vehicles, but may be the mobile terminal 60, for example. This can be realized, for example, by installing an application program for causing a computer to execute a process according to the processes illustrated in FIGS. 3 to 6 in the mobile terminal 60.

Electronic Control Unit

In the above embodiment, the ROM is illustrated as the memory constituting the electronic control unit, and a type of ROM is not mentioned. For example, the ROM may be a non-rewritable memory or may be an electrically rewritable nonvolatile memory.

The electronic control unit is not limited to an electronic control unit configured to include a program storage device such as a ROM that stores a program, and a CPU that executes the program. For example, the electronic control unit is not limited to a software processing circuit including the CPU and the program storage device and may be, for example, a dedicated hardware circuit that executes a predetermined process, such as an ASIC. Further, the electronic control unit may include both of the software circuit and the dedicated hardware processing circuit.

Storage Device

A data storage device regarding the prior distribution is not limited to an electrically rewritable nonvolatile storage device and may be, for example, a backup type RAM in which supply of power is maintained even when a main power supply of the ECU 30 enters an OFF state. Further, the storage device may include a RAM that is supplied with power solely when a main power supply enters an ON state, and the non-volatile storage device. In this case, for example, the data stored in the RAM before the main power supply enters an OFF state may be stored in the nonvolatile storage device.

Others

In the embodiment, when a plurality of users uses one vehicle 10, the ON switching threshold value xthfn and the OFF switching threshold value xthnf are generated for each user, but the present disclosure is not limited thereto, and in one vehicle 10, a single ON switching threshold value xthfn and a single OFF switching threshold value xthnf may be used even when a user is changed.

What is claimed is:

1. A headlight control data generation device that generates headlight control data of a vehicle including a headlight, in which the headlight control data is data that is used in an automatic mode in the vehicle to select a manual mode in which a user manually performs a switching operation from one of an ON state and an OFF state of the headlight to the other, or the automatic mode for executing an automatic mode process which is at least one of a process of automatically performing the switching operation and a process of outputting a guidance notification signal for requesting the switching operation to a notification device, the headlight control data generation device comprising:
an electronic control unit configured to
sequentially acquire, when the manual mode is selected, set data including a detection value of an illuminance around the vehicle and ON and OFF data indicating that the headlight is in the ON state or in the OFF state at a time of sampling the detection value; and
generate the headlight control data based on the acquired set data, wherein:

the headlight control data includes data regarding information on a probability of the headlight being in the ON state; and
the information on the probability of the headlight being in the ON state is information in which the probability of the headlight being in the ON state increases when the illuminance is within a predetermined range when a proportion of the set data indicating that the headlight is in the ON state among the set data indicating that the detection value of the illuminance is within the predetermined range is relatively high, as compared with when the proportion of the set data is relatively low.

2. The headlight control data generation device according to claim 1, wherein:
an ON switching threshold value that is a threshold value of the illuminance for switching from the ON state to the OFF state in the automatic mode and an OFF switching threshold value that is a threshold value of the illuminance for switching from the OFF state to the ON state in the automatic mode are set independently of each other;
the headlight control data includes, as data including the information on the probability of the headlight being in the ON state, data regarding ON switching probability information for generating the ON switching threshold value, and data regarding OFF switching probability information for generating the OFF switching threshold value; and
the electronic control unit is configured to further determine a percentage of contribution to the ON switching probability information of the acquired set data and a percentage of contribution to the OFF switching probability information of the acquired set data based on information on the illuminance around the vehicle.

3. The headlight control data generation device according to claim 2, wherein:
the information on the illuminance is information indicating whether the illuminance tends to decrease or the illuminance tends to increase; and
the electronic control unit is configured to further determine whether the illuminance tends to decrease or tends to increase.

4. The headlight control data generation device according to claim 3, wherein the electronic control unit is configured to determine whether the illuminance tends to increase or tends to decrease based on a time zone.

5. The headlight control data generation device according to claim 3, wherein:
the electronic control unit is configured to
calculate a posterior distribution of an adjustment parameter of an ON switching class posterior probability based on the set data, the ON switching class posterior probability, and an ON switching prior distribution, and
calculate a posterior distribution of an adjustment parameter of an OFF switching class posterior probability based on the set data, the OFF switching class posterior probability, and an OFF switching prior distribution;
the ON switching class posterior probability is a function in which a detection value of the illuminance is an independent variable, and a probability of the headlight being in an ON state or an OFF state is a dependent variable, the function being a function for switching from the OFF state to the ON state;
the ON switching prior distribution is a probability distribution of the adjustment parameter for adjusting a value of the dependent variable with respect to the value of the independent variable of the ON switching class posterior probability;

the OFF switching class posterior probability is a function in which a detection value of the illuminance is an independent variable, and a probability of the headlight being in an ON state or an OFF state is a dependent variable, the function being a function for switching from the ON state to the OFF state;

the OFF switching prior distribution is a probability distribution of the adjustment parameter for adjusting a value of the dependent variable with respect to the value of the independent variable of the OFF switching class posterior probability;

the data regarding the ON switching probability information includes data on the posterior distribution of the adjustment parameter in the ON switching class posterior probability; and the data regarding the OFF switching probability information includes data on the posterior distribution of the adjustment parameter in the OFF switching class posterior probability.

6. A vehicle control device comprising the headlight control data generation device according to claim 2, wherein the electronic control unit is configured to set the ON switching threshold value and the OFF switching threshold value based on the headlight control data, and is configured to perform switching from the OFF state to the ON state of the headlight on condition that the detection value of the illuminance is smaller than the ON switching threshold value when the headlight is in the OFF state in the automatic mode, and perform switching from the ON state to the OFF state of the headlight on condition that the detection value of the illuminance is greater than the OFF switching threshold value when the headlight is in the ON state in the automatic mode.

7. The headlight control data generation device according to claim 1, wherein:
the electronic control unit is configured to further determine whether a traveling speed of the vehicle is equal to or lower than a threshold value; and
the electronic control unit is configured to use the acquired set data for generation of the headlight control data on condition that it is not determined that the traveling speed of the vehicle is equal to or lower than the threshold value.

8. The headlight control data generation device according to claim 1, wherein:
the electronic control unit is configured to further determine whether or not the vehicle passes through a tunnel; and the electronic control unit is configured to use the acquired set data for generation of the headlight control data on condition that it is not determined that the vehicle passes through the tunnel.

9. The headlight control data generation device according to claim 1, wherein:
the electronic control unit is configured to further determine whether or not there is a predetermined building within a predetermined distance from the vehicle; and
the electronic control unit is configured to use the acquired set data for generation of the headlight control data on condition that the electronic control unit does not determine that there is the predetermined building.

10. A headlight control data generation device that generates headlight control data of a vehicle including a headlight, in which the headlight control data is data that is used in an automatic mode in the vehicle to select a manual mode in which a user manually performs a switching operation from one of an ON state and an OFF state of the headlight to the other, or the automatic mode for executing an automatic mode process which is at least one of a process of automatically performing the switching operation and a process of outputting a guidance notification signal for requesting the switching operation to a notification device, the headlight control data generation device comprising:
an electronic control unit configured to
sequentially acquire, when the manual mode is selected, set data including a detection value of an illuminance around the vehicle and ON and OFF data indicating that the headlight is in the ON state or in the OFF state at a time of sampling the detection value; and
generate the headlight control data based on the acquired set data, wherein:
the headlight control data includes a threshold value for the switching operation in the automatic mode; and
the electronic control unit is configured to set the threshold value in an area of the illuminance in which both of the set data with which the headlight is in the ON state and the set data with which the headlight is in the OFF state coexist.

11. A vehicle control device comprising the headlight control data generation device according to claim 10, wherein the electronic control unit is configured to perform switching to the other of the OFF state and the ON state of the headlight based on a magnitude comparison between the detection value of the illuminance and the threshold value when the headlight is in any one of the ON state and the OFF state in the automatic mode.

* * * * *